United States Patent [19]
Rolt et al.

[11] 3,760,922
[45] Sept. 25, 1973

[54] ROTARY COUPLINGS

[75] Inventors: Anthony P. R. Rolt, Stratford-on-Avon; Derek Gardner, Leamington Spa, both of England

[73] Assignee: Harry Ferguson Limited, Coventry, Great Britain

[22] Filed: July 16, 1971

[21] Appl. No.: 163,385

[30] Foreign Application Priority Data

July 18, 1970 Great Britain.................... 34,950/70
July 18, 1970 Great Britain.................... 34,952/70

[52] U.S. Cl. .......................... 192/111 B, 74/710.5
[51] Int. Cl. ........................ F16d 13/74, F16h 1/44
[58] Field of Search ................. 192/111 B; 188/264

[56] References Cited
UNITED STATES PATENTS

| | | | |
|---|---|---|---|
| 3,198,295 | 8/1965 | Fangman et al............. | 192/113 B X |
| 3,272,188 | 9/1966 | Sabat............................ | 192/58 B X |
| 3,151,705 | 10/1964 | Chatham et al............. | 192/111 R X |
| 2,407,699 | 9/1946 | Hill............................... | 192/113 B UX |
| 3,002,595 | 10/1961 | Weir.............................. | 192/113 B X |
| 3,025,686 | 3/1962 | Lewis............................ | 192/113 B X |
| 3,335,834 | 8/1967 | Wach........................... | 192/113 A X |

FOREIGN PATENTS OR APPLICATIONS 644,173  10/1950  Great Britain ................. 192/113 B Primary Examiner—Arthur T. McKeon
Attorney—Thomas B. Van Poole et al.

[57] ABSTRACT

A device for controlling or limiting difference in rotational speed or acceleration between relatively rotatable shafts, for example the front and rear propeller shafts in a four-wheel drive motor vehicle transmission, employs a viscous liquid such as a silicone fluid in contact with relatively rotatable sets of mutually interleaved and mutually spaced annular plates the working surfaces of which are provided with through openings in the form of holes and/or radial slots from which are derived in combination with the inclusion of a predetermined quantity of air in the viscous liquid advantages including inter alia improved compactness in relation to torque capacity and in relation to dissipation of heat generated during shearing of the viscous fluid. A transmission unit incorporating an interaxle differential gear and such a device is described.

11 Claims, 17 Drawing Figures

Inventors
Anthony P.R. Rolt
Derek Gardner

ROTARY COUPLINGS

This invention relates to a device for controlling or limiting difference in angular velocity or angular acceleration between relatively rotatable members. Hereinafter and in the appended claims such a device is referred to as "a control coupling."

Control couplings embodying the principle of torque transmission through a viscous fluid in contact with the adjacent surfaces of mutually interleaved elements have been proposed. Hitherto, such couplings as have been designed for a duty such as the limitation of angular velocity or angular acceleration between two members of a differential gear in a vehicle transmission have met with limited success due to shortcomings in respect of meeting various combinations of requirements including compactness in relation to torque capacity and in relation to dissipation of heat generated in use during shearing of the viscous fluid; optimum durability and reliability both in relation to wear and in relation to distortion of the interleaved elements caused by mechanical stress and by temperature gradients; torque capacity during high rates of forced relative rotation of the interleaved elements; torque capacity during transient angular acceleration; and ease of introduction of the viscous fluid into the coupling during manufacture so as to ensure the presence of a proper quantity of viscous fluid between the interleaved elements.

An object of the present invention is to provide a control coupling in which the above-mentioned shortcomings are obviated or mitigated.

According to the present invention, there is provided a control coupling comprising mutually spaced and mutually interleaved elements arranged for rotation about a common axis within an enclosure containing a viscous fluid in contact with adjacent surfaces of said elements, alternate ones of said elements constituting a first set of elements for driving connection with a first rotatable member, remaining ones of said elements constituting a second set of elements for driving connection with a second rotatable member, the torque-transmitting capability of the coupling in relation to rotational speed-difference between the sets of elements being progressive throughout a desired speed difference range by virtue of the inclusion of a predetermined quantity of gas in the viscous fluid in combination with the provision of means defining openings through the said surfaces of the elements.

Embodiments of the present invention will now be described, by way of example, with reference to the accompanying drawings whereof:

Figure 1:
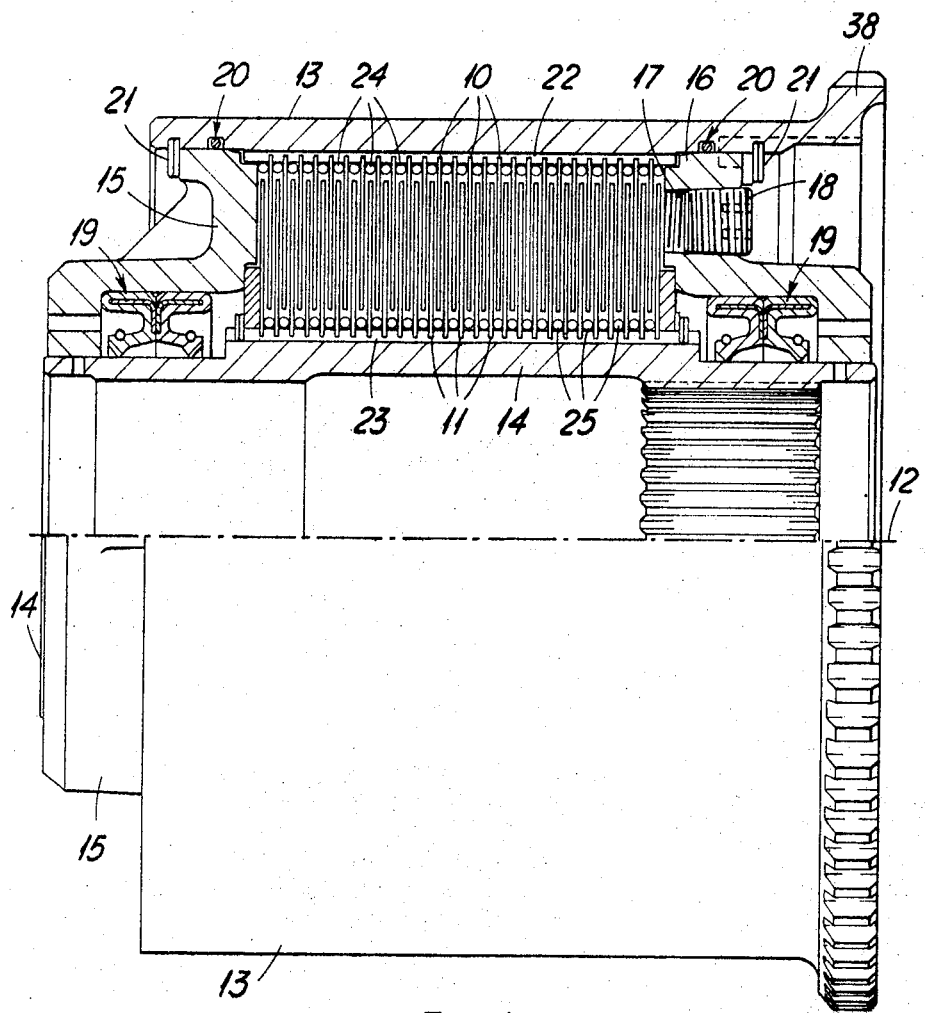
FIG. 1 is a part-sectional elevation of a control coupling in accordance with the present invention.
Figure 2:
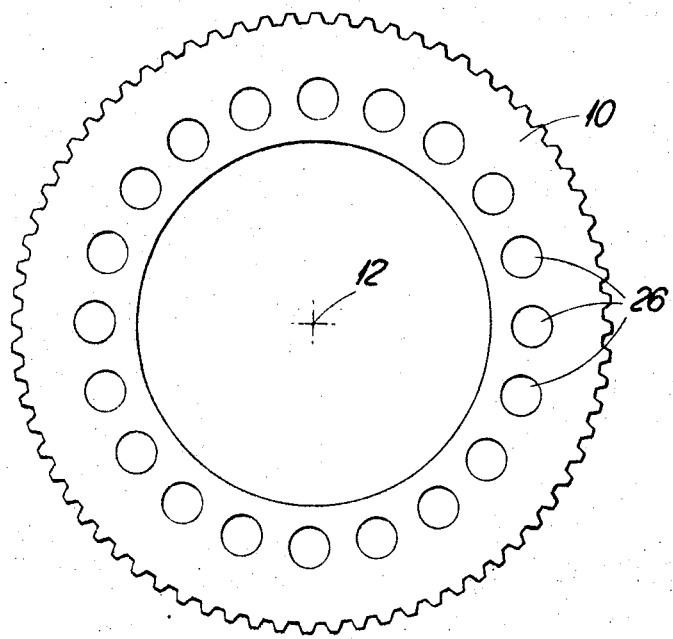
FIGS. 2 and 3 are respectively plan views of "outer" and "inner" annular plates shown in FIG. 1, but to a smaller scale.
Figure 3:
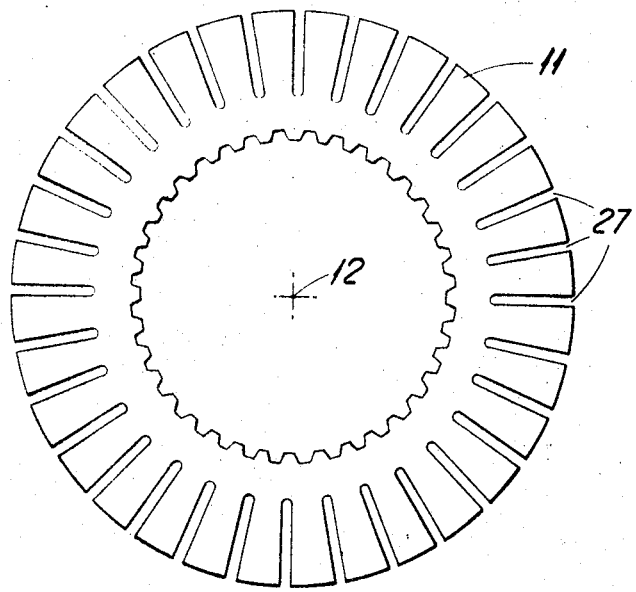
Figure 4:
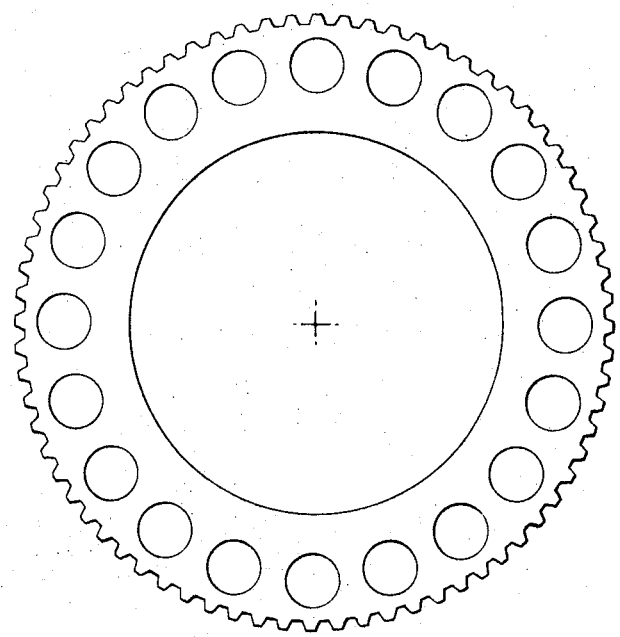
FIGS. 4 to 8 are plan views showing examples of alternative configurations of "outer" annular plates.
Figure 5:
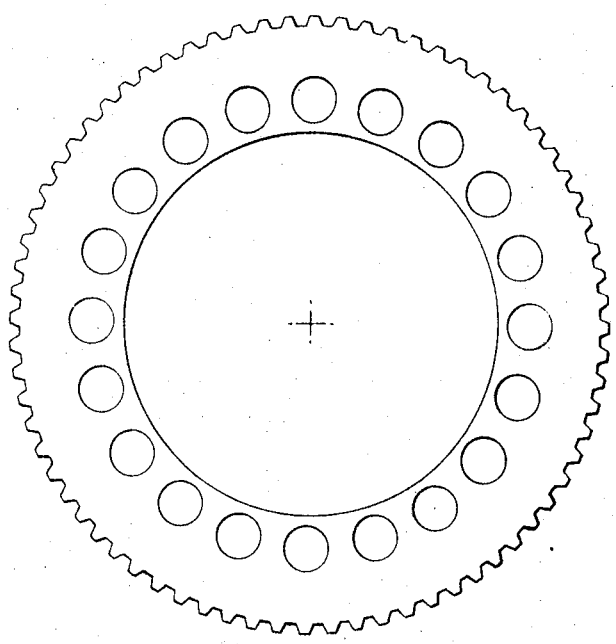
Figure 6:
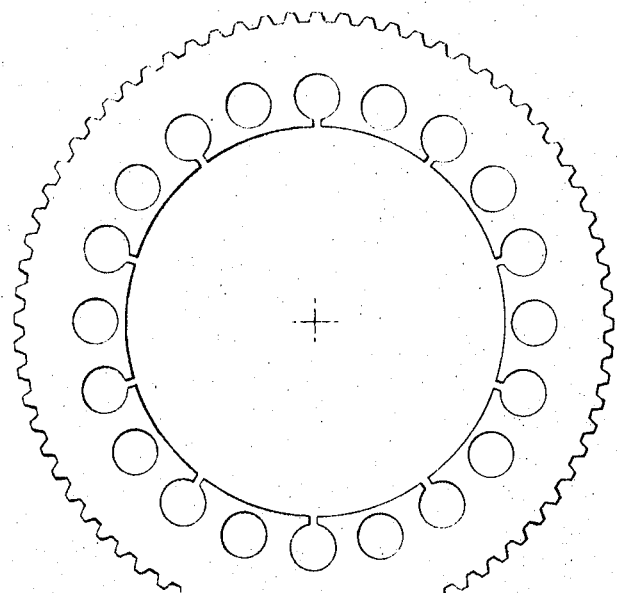
Figure 7:
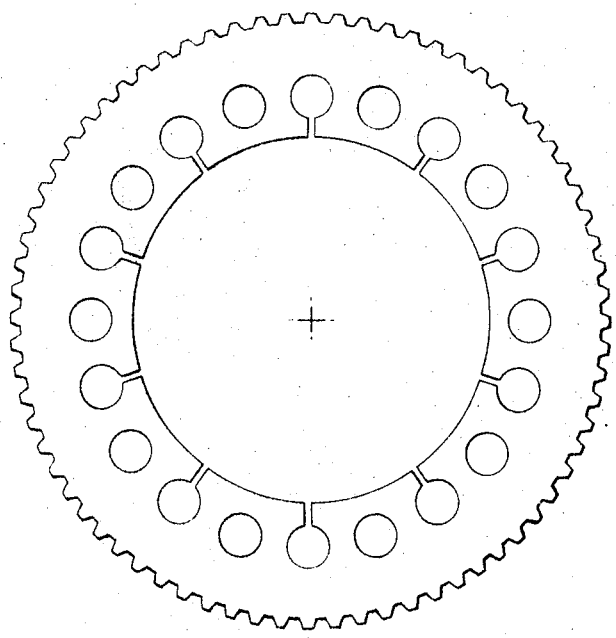
Figure 8:
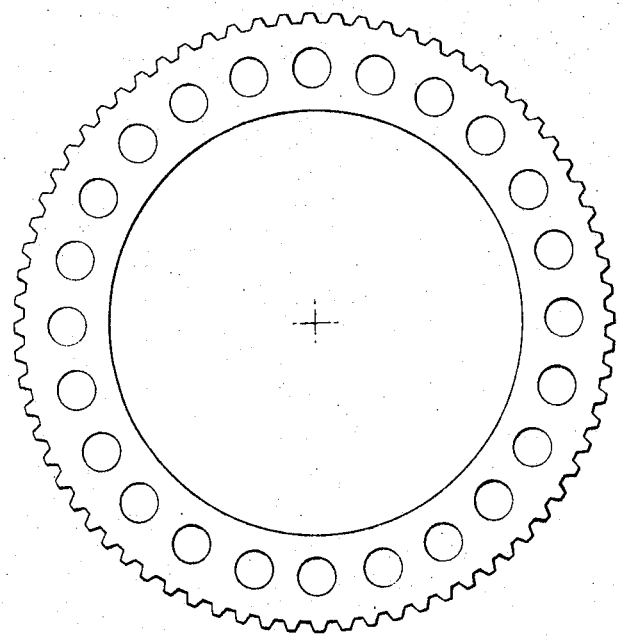
Figure 9:
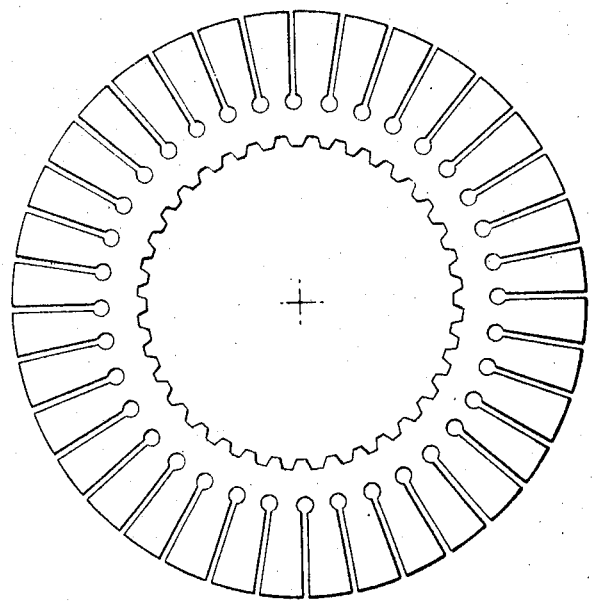
FIGS. 9 to 14 are plan views showing examples of alternative configurations of "inner" annular plates.
Figure 10:
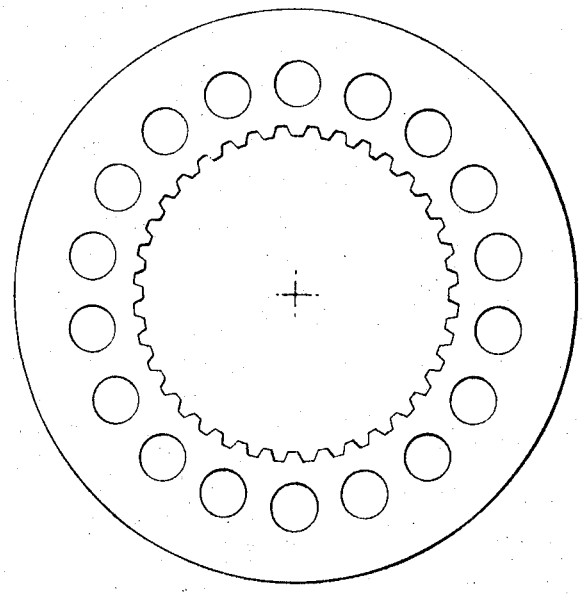
Figure 11:
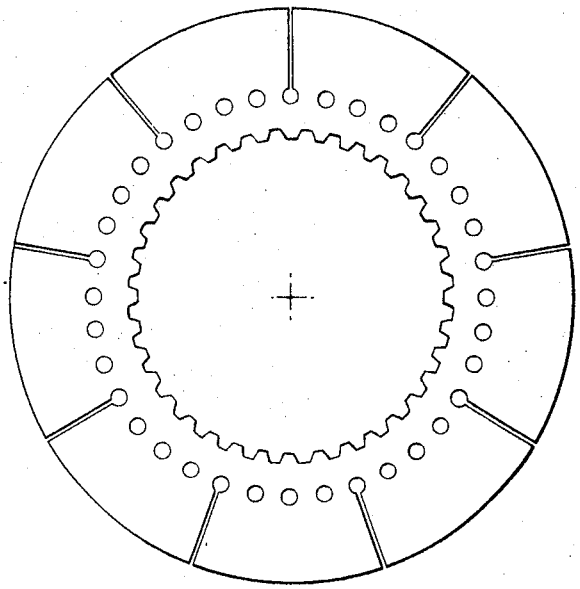
Figure 12:
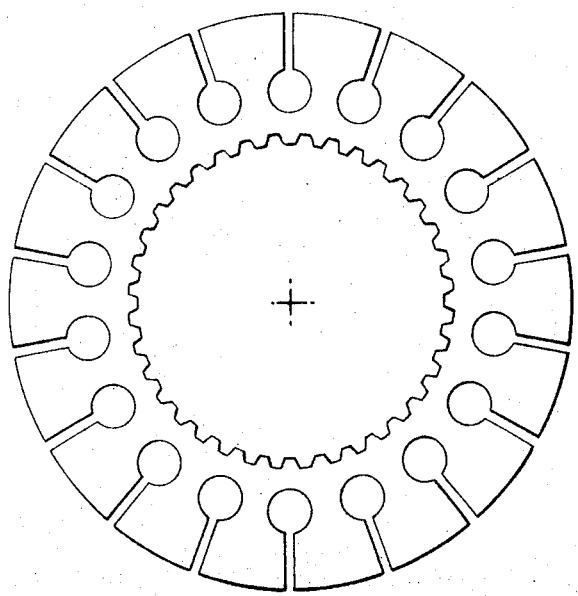
Figure 13:
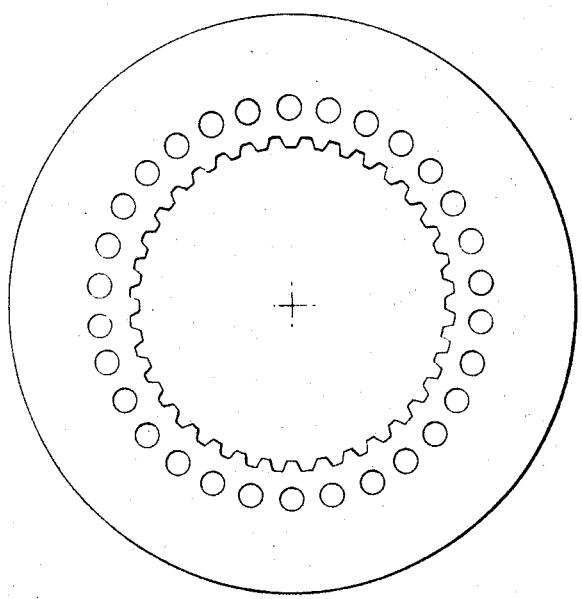
Figure 14:
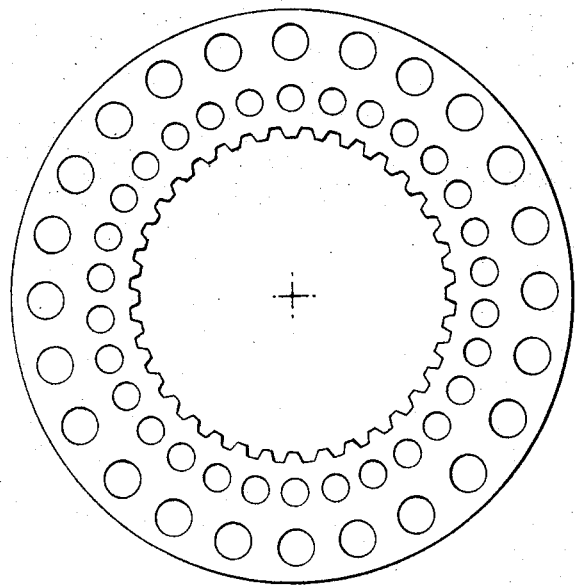

In FIGS. 1 to 3 of the drawings, a control coupling for limiting freedom of differential action of an interaxle differential gear in a motor vehicle transmission (examples of which are hereinafter described) consists of mutually spaced and mutually interleaved elements in the form of "outer" and "inner" annular plates 10 and 11 respectively, the plates 10, 11 being arranged for rotation about a common axis 12 within an enclosure defined by relatively rotatable mutually concentric cylindrical walls 13 and 14 with co-operating end plates 15, 16. The enclosure contains a viscous fluid (not illustrated) admitted by way of a filling hole 17 closed by a plug 18, and retained by means of seals indicated at 19 and 20. The end plates 15, 16 are held by retaining rings 21. The outer plates 10 are peripherally toothed (FIG. 2) and are in driving engagement with the outer wall 13 by way of axial splines 22 on the inner surface of wall 13. The inner plates 11 are internally toothed (FIG. 3) and are in driving engagement with the inner wall 14 by way of axial splines 23 on the radially outer surface of wall 14. The walls 13, 14 are adapted for driving connection with first and second relatively rotatable members constituted by two members of a differential gear as hereinafter explained. The plates of each set of outer and inner plates 10, 11 are spaced apart by means of axial spacers 24, 25 in the form of wire rings whereof the wire diameter is such that the plates 10, 11 are freely interleaved and the viscous fluid makes contact with the surfaces of the plates.

The spaces on opposite sides of each of the plates 10, 11 are in fluid communication by way of openings through the working surfaces of the plates. These openings in the outer plates 10 are constituted by a plurality of through apertures 26 (FIG. 2) arranged around the axis 12; and in the inner plates 11 by a plurality of open-ended radial slots 27 (FIG. 3). The function of these openings is discussed later herein. In FIG. 2, the outer plate 10 is 2.50 inches inside diameter; the through apertures 26 are 20 in number, 5/16 inches diameter, and arranged equi-angularly on a pitch circle diameter of approximately 3 inches. The plate 10 is 0.022 inches thick and of nickle-plated mild steel. In FIG. 3, the inner plate 11 is 3.93 inches outside diameter; the radial slots 27 are 32 in number, 1/16 inches wide, and arranged equiangularly with the closed ends of the slots on a pitch circle diameter of 2.75 inches. the plate 11 is of the same material and thickness as the plate 10.

The control coupling incorporates 26 outer plates 10, and 27 inner plates 11. The wire diameter of the axial spacers 24, 25 is 0.048 inches.

The viscous fluid is a silicone fluid having a in order viscosity of 45,000 centi-stokes to 60,000 centi-stokes. The nominal value of viscosity may be above or below these figures depending upon the operating characteristics required. The fluid is preferably introduced by a vacuum-filling process. After filling, a precentage of the contained fluid is removed, for example by heating the entire coupling to, say, 100°C, inorder to adjust the torque characteristics as hereinafter discussed, and to make provision within the enclosure for expansion of the viscous fluid due to heat generated during operation of the control coupling. The percentage of fluid removed affects the performance of the control coupling in that its torque-transmitting capability is significantly impaired when the quantity of gas or air in the viscous fluid is such that the volume of gas or air within the coupling exceeds 15 per cent of the volume of the contained viscous fluid at a selected ambient temperature. The preferred percentage volume of gas or air at an ambient temperature of, say 25°C has been found dependent to some extent upon the viscosity of the fluid used, the higher the viscosity value, the greater is the acceptable percentage volume of gas or air. Using a fluid having a nominal viscosity of value in the range given above, a volume of air equal to 10 per cent of the fluid volume at 25°C has been found to be consistent with satisfactory coupling performance up to an operating temperature in the region of 100°C. Air volume values of less than 5 per cent may, of course, be used in conjunction with a restriction on maximum operating temperature. It is envisaged that in addition to air an expansion-accommodating means may be incorporated, for example a resilient cellular structure held by one of the end plates 15, 16.

FIGS. 4 to 14 illustrate various alternative outer and inner plate configurations. These figures are drawn to the same scale as FIGS. 2 and 3.

Figure 15:
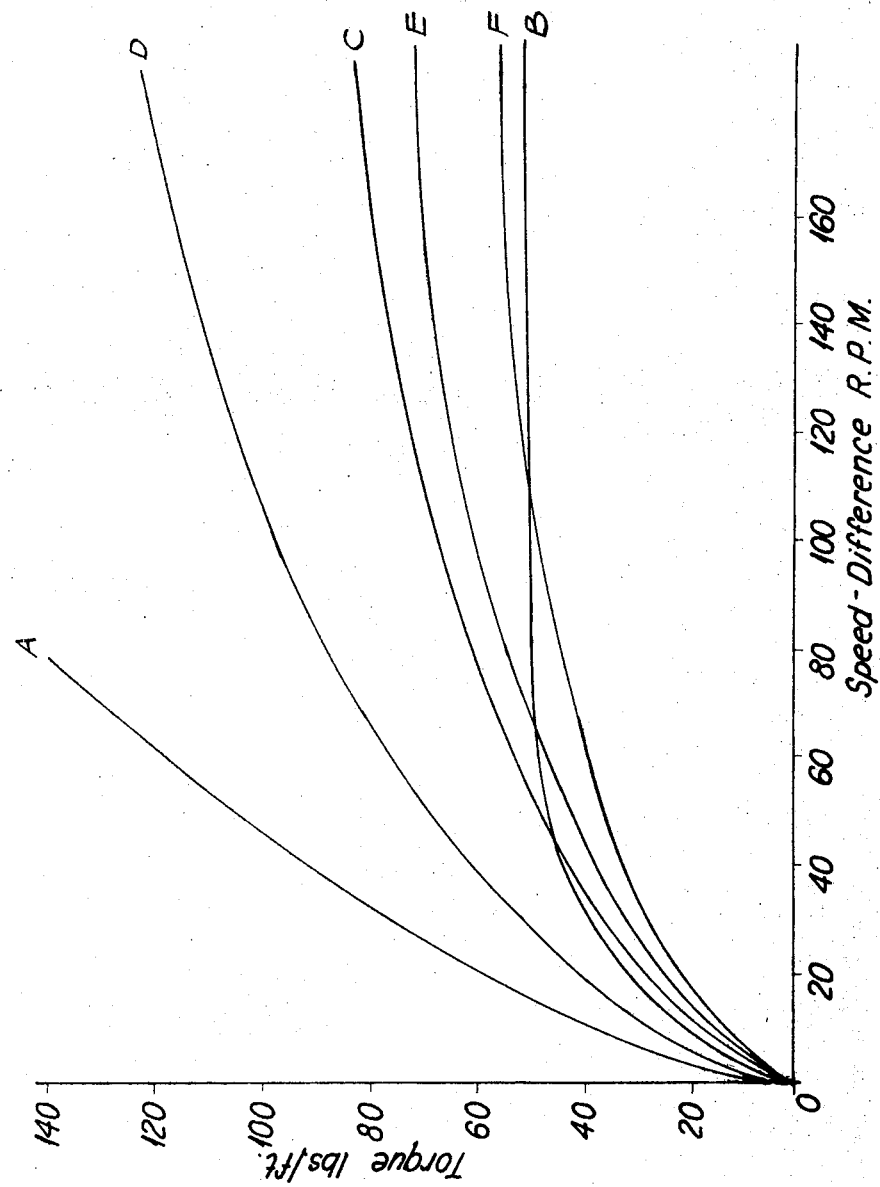
FIG. 15 shows graphs of torque in relation to speed-difference for control couplings with and without the characteristics attributable to the present invention.

With regard to the provision of a percentage of gas or air within the coupling, and the provision of openings through the surfaces of the plates, the significance of these provisions is now discussed by way of explanation with reference to FIG. 15.

All of the graphs of FIG. 15 are based on test data obtained at an operating temperature of approximately 50°C. Moreover, the total number of plates, the gaps between the plates, and the nominal viscosity of the fluid were the same for each test.

Having regard to the nature of the particular task herein envisaged by way of example for a control coupling in accordance with the present invention, it can be appreciated that the torque-transmitting capability of the coupling in relation to rotational speed-difference between the sets of plates must be progressive throughout the range of speed-difference likely to be encountered. Further, it must be understood that, during relatively high speed-difference values, operating temperatures may reach a value in the region of or in excess of 100°C due to heat generated during viscous shear. Accordingly, provision for expansion of the vsicous fluid must take into account the possibility of such temperatures, otherwise excessive pressure build-up within the coupling would damage the seals.

Graph A in FIG. 15 shows the relationship between torque and speed-difference for a coupling as herein described, but with no provision of air in the viscous fluid, and with no openings through the surfaces of the plates. In Graph A it can be seen that torque increases rapidly particularly at relatively low values of speed-difference (corresponding with relatively low values of viscous shear rate). Such a coupling displays excessive "stiffness" at low speed-difference values, and, more importantly cannot endure an operating temperature range greater than approximately 25°C without a serious risk of damage to the seals due to pressure caused by expansion of the viscous fluid. Consequently, the coupling related to Graph A cannot cope with the speed-difference range likely to be encountered.

Graph B shows the torque/speed-difference relationship for a coupling with no openings such as is represented by Graph A, but with the provision of 10 per cent air in the viscous fluid at an ambient temperature in the region of 25°C. In Graph B, it can be seen that the coupling "stiffness" is reduced at relatively low speed-difference values. Moreover, the provision of the air accommodates expansion of the viscous fluid so allowing the coupling to operate throughout the envisaged temperature range and so throughout the desired speed-difference range without damage to the seals. However, Graph B also clearly shows that torque reaches a relatively low limit value so that progressive control is not obtained with increasing values of speed-difference.

Graph C shows the torque/speed-difference relationship for a coupling as herein described having a 10 per cent air provision and openings in the form of a series of holes through the working surfaces of each plate. In Graph C, it can be seen that progressive control is obtained throughout the desired speed-difference range.

Graph D shows the torque/speed-difference relationship for a coupling as herein described having a 10 per cent air provision and openings as shown in FIGS. 2 and 3. In Graph D can be seen an improvement in the progressive characteristic.

Graphs E and F show the torque/speed-difference relationships for couplings as herein described having plates as shown in FIGS. 2 and 3, but with fifteen per cent and twenty per cent air respectively. These Graphs E and F illustrate how the desired coupling performance is progressively impaired and finally lost by increasing the precentage of air even when the plate configuration of FIGS. 2 and 3 is used.

Graph A is also representative of the torque/speed-difference relationship for a coupling having plates as shown in FIGS. 2 and 3, but with no provision of air in the viscous fluid.

Thus, FIG. 15 illustrates the significance of the provision of a limited quantity of air in combination with the provision of openings through the plate surfaces in order to obtain a torque/speed-difference relationship which is progressive over a wide range of speed differences. Moreover, by comparing the torque-transmitting capability of the coupling represented by Graph B with that of the coupling represented by Graph E or Graph C or Graph D, it can be appreciated that in the coupling embodying the present invention, a substantial improvement in torque-transmitting capacity is achieved in relation to coupling size because the "E," "C" and "D" couplings are no larger than the "B" coupling. A characteristic not illustrated by FIG. 15 is that, in a control coupling such as described herein, increased torque capacity is obtained during transient speed-differences or "snatch" operation. This is of value where the control coupling is used to control the action of a differential gear in a motor vehicle transmission. The provision of openings also improves heat dissipation within the control coupling by facilitating fluid circulation within the enclosure. This is advantageous in minimizing temperature gradients over the plates 10, 11 with a consequent reduction in thermal distortion. As a further consequence, the plates 10, 11 are less prone to buckling to a degree sufficient to cause them to come into mutual rubbing contact so that wear is reduced and durability and reliability are increased. The openings in the form of open-ended radial slots contribute towards thermal and mechanical stress relief. Further, the presence of the openings facilitates introduction of the viscous fluid into the spaces between the working surfaces of the plates 10, 11. This facility obviates or mitigates the possible presence of pockets of trapped air and so improves the degree of control which can be exercised in providing a desired percentage volume of air within the coupling to allow for fluid expansion due to heat generated during operation.

Modifications of the control coupling described above, within the scope of the appended claims, include dispensing with the openings in selected ones of the plates 10, 11; employing through apertures in place of slots and vice-versa; dispensing with one set of axial spacers; employing axial spacers which are integral with the plates 10, 11; altering the relationship between plate thickness and axial spacing so as to adjust the clearance between the plates; changing the numbers of the plates; selecting viscous fluids of greater or less viscosities; and employing cylindrical elements in place of annular plates.

It is envisaged that a control coupling in accordance with the present invention may be used to control or limit difference in angular velocity or angular acceleration between rotatable members such as, for further example, associated shafts or arms in a vehicle suspension, or for other damping purposes. It is further envisaged that a control coupling in accordance with the present invention may serve as a drive coupling which is sensitive to speed-difference.

Figure 16:
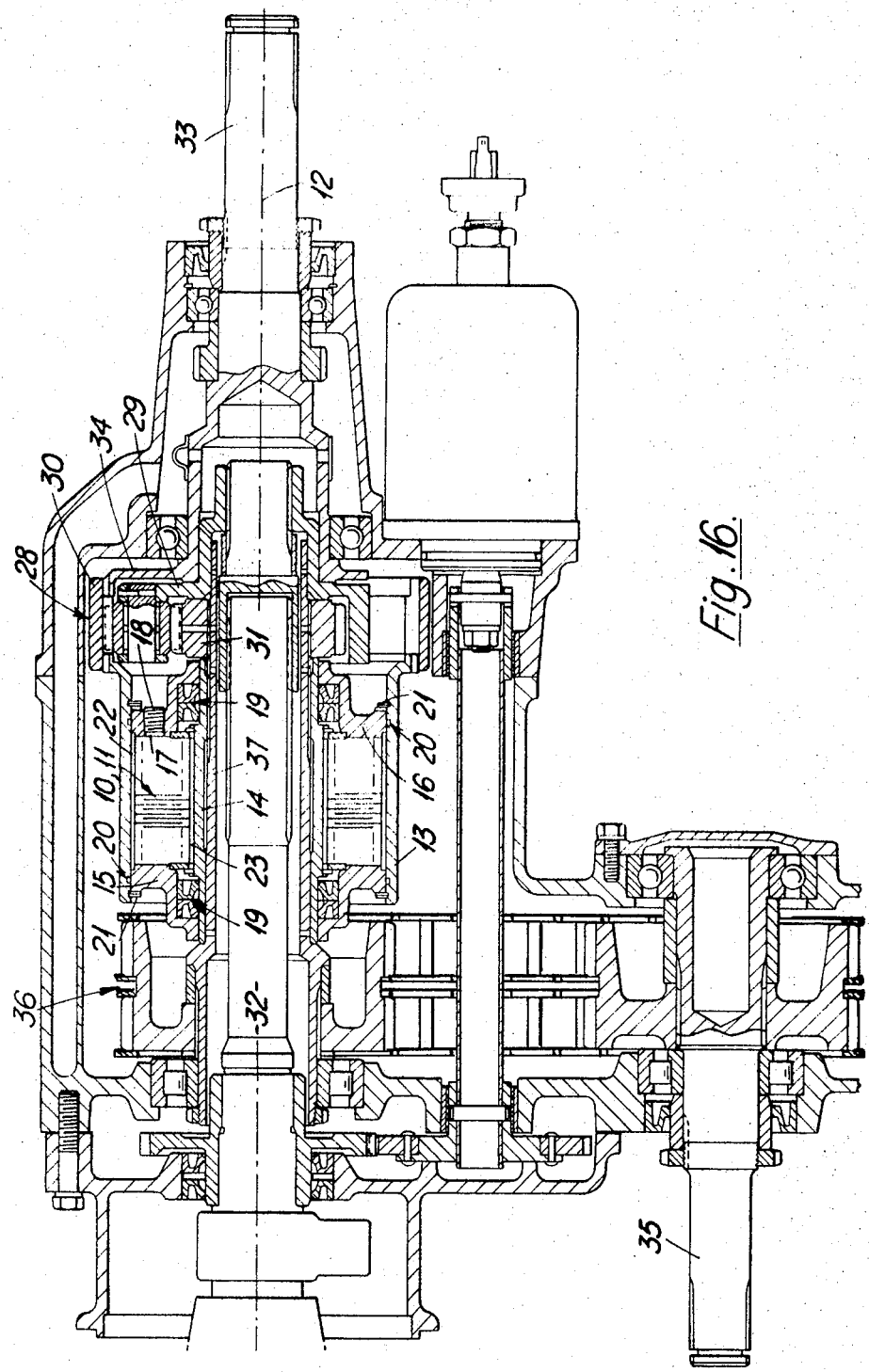
FIG. 16 is a sectional elevation of part of a motor vehicle transmission incorporating a control coupling in accordance with the present invention.

In FIG. 16, the control coupling above described is incorporated in a motor vehicle transmission including an interaxle differential gear 28 for distributing drive to front and rear pairs of road wheels (not shown). The differential gear 28 is of the planetary spur type whereof a planet carrier 29 is the input (engine driven), the annulus 30 is the output to one set of road wheels, and the sun gear 31 is the output to the other set of road wheels. The planet carrier is driven by way of an input shaft 32 co-axial with the axis 12 of the differential gear 28. One output shaft 33 is connected to the annulus 30 by way of a flange 34 having peripheral teeth engaged with the annulus 30. The other output shaft 35 is connected to the sun gear 31 by way of a chain-and-sprocket drive transfer 36 and tubular shaft 37 to which the sun gear is splined. The control coupling is mounted co-axially with the differential gear 28, the outer wall 13 of the coupling having a peripherally toothed flange 38 engaged with the annulus 30. The inner wall 14 of the coupling is splined to the tubular shaft 37 and is thus in driving connection with the sun gear 31.

During operation of the transmission of FIG. 16, the differential gear 28 normally rotates with no differential action or with a relatively small degree of differential action during vehicle cornering and due to slight differences in effective road wheel diameters between front and rear. This relatively small degree of differential action involves relatively low values of speed difference between the annulus 30 and the sun gear 31, such speed difference developing a torque transmission value within the control coupling sufficiently low to constitute an insignificant impedance to the action of the differential gear 28. In the event of a tendency towards front or rear road wheel spin during drive or lock during braking, a relatively large degree of differential action in the differential gear 28 is opposed or limited by the development in the control coupling of a relatively high torque transmission value which provides an effective coupling of the front and rear wheels and inhibits wheel spinning or locking. The transmission operates as described in both forward and reverse drive.

Figure 17:
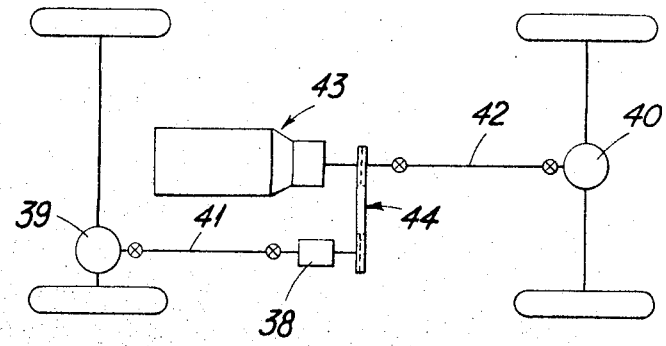
FIG. 17 is a diagrammatic representation of another motor vehicle transmission incorporating a control coupling in accordance with the present invention.

In FIG. 17, a control coupling as herein described (indicated in FIG. 17 by reference numeral 38) is incorporated in a motor vehicle transmission including separate final drives in the form of front and rear interwheel differential gears 39 and 40, inputs to which are constituted by propeller or drive shafts 41, 42, the shaft 42 being driven by an engine/gear-box unit 43. The shafts 41, 42 constitute relatively rotatable members and are mutually connected, through a drive transfer 44, by the control coupling 38. In operation, during normal forward or reverse drive, only the rear wheels are positively driven by virtue of being in direct driving connection, through interwheel differential gear 40 and propeller shaft 42, with the output of the engine/gearbox unit 43. Drive to the front wheels is not positive because little or no torque is transmitted by the control coupling 38 while there is little or no speed-difference between the relatively-rotatable parts of the control coupling; it being understood that the road wheel diameters and various transmission ratios are such that during normal forward or reverse drive the propeller shaft 41 rotates at substantially the same speed as the input to the control coupling 38, and is caused to rotate by virtue of the front road wheels rolling along the road surface. In the event of a tendency towards rear wheel spin, there is established a significant speed-difference between the front and rear transmission lines and the control coupling 38 therefore develops sufficient torque to provide a coupling between front and rear drive shafts 41, 42 sufficient to inhibit rear wheel spin provided that the front wheels maintain good contact with the road surface. Similarly, in the event of a tendency towards front or rear wheel locking, the control coupling 38 inhibits such locking.

We claim:

1. A control coupling comprising mutually spaced and mutually interleaved elements arranged for rotation about a common axis within an enclosure containing a viscous fluid in contact with adjacent surfaces of said elements, alternate ones of said elements constituting a first set of elements for driving connection with a first rotatable member, remaining ones of said elements constituting a second set of elements for driving connection with a second rotatable member, the torque-transmitting capability of the coupling in relation to rotational speed-difference between the sets of elements being progressive throughout a desired speed-difference range by virtue of the inclusion of a predetermined quantity of gas in the viscous fluid in combination with the provision of means defining openings through the said surfaces of the elements.

2. A control coupling according to claim 1, wherein the quantity of gas included in the viscous fluid is such that the volume of the gas at a selected ambient temperature is equal to or less than fifteen per cent of the volume of the viscous fluid.

3. A control coupling according to claim 2, wherein each of said elements is an annular plate, and said means defining openings in respect of the plates in one of the sets comprises a plurality of through apertures arranged around the said common axis, and the said means defining openings in respect of the plates of the other of the sets comprises a plurality of open-ended slots arranged around the said common axis.

4. A control coupling according to claim 3, wherein the quantity of gas included in the viscous fluid is such that the volume of gas within the enclosure at an ambient temperature in the region of 25°C is approximately 10 percent of the volume of the viscous fluid.

5. A control coupling according to claim 4, wherein the said enclosure includes mutually concentric cylindrical walls relatively rotatable about said common axis and adapted respectively for driving connection with first and second rotatable members, the plates of one of said sets being in driving connection with the outer of said walls, and the plates of the other of said sets being in driving connection with the inner of said walls.

6. A control coupling according to claim 5, wherein the plates having the said plurality of through apertures are in driving connection with the said outer of said walls, and the plates having the plurality of open-ended slots are in driving connection with the said inner of said walls.

7. A control coupling according to claim 6, wherein the viscous fluid is a silicone fluid.

8. A control coupling according to claim 1, wherein the quantity of gas included in the viscous fluid is such that the volume of the gas at an ambient temperature in the region of 25°C is approximately 10 per cent of the volume of the viscous fluid.

9. A control coupling according to claim 1, wherein each of said elements is an annular plate.

10. A control coupling according to claim 9, wherein said means defining openings in respect of the plates in one of the sets comprises a plurality of through apertures arranged around the said common axis, and the said means defining openings in respect of the plates of the other of the sets comprises a plurality of open-ended slots arranged around the said common axis.

11. A control coupling according to claim 1, wherein the viscous fluid is a silicone fluid.

* * * * *